United States Patent
Zhang et al.

(10) Patent No.: US 10,254,571 B2
(45) Date of Patent: Apr. 9, 2019

(54) LIQUID CRYSTAL ADJUSTMENT DEVICE, CRYSTAL DISPLAY PANEL AND METHOD FOR ADJUSTING AMOUNT OF LIQUID CRYSTALS IN LIQUID CRYSTAL DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengju Zhang, Beijing (CN); Detao Zhao, Beijing (CN); Hanqing Liu, Beijing (CN); Xin Li, Beijing (CN); Hong Zhu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/527,140

(22) PCT Filed: Oct. 21, 2016

(86) PCT No.: PCT/CN2016/102828
§ 371 (c)(1),
(2) Date: May 16, 2017

(87) PCT Pub. No.: WO2017/118154
PCT Pub. Date: Jul. 13, 2017

(65) Prior Publication Data
US 2018/0299707 A1    Oct. 18, 2018

(30) Foreign Application Priority Data
Jan. 4, 2016 (CN) .......................... 2016 1 0006827

(51) Int. Cl.
*G02F 1/13* (2006.01)
*G02F 1/1341* (2006.01)

(52) U.S. Cl.
CPC .............. *G02F 1/1303* (2013.01); *G02F 1/13* (2013.01); *G02F 1/1309* (2013.01); *G02F 1/1341* (2013.01)

(58) Field of Classification Search
CPC ................................................... G02F 1/1303
See application file for complete search history.

(56) References Cited

U.S. PATENT DOCUMENTS

| 2003/0103185 | A1 | 6/2003 | Kim et al. |
| 2010/0225872 | A1 | 9/2010 | Chen et al. |
| 2014/0240648 | A1 | 8/2014 | Zhao et al. |

FOREIGN PATENT DOCUMENTS

| CN | 1230706 C | 12/2005 |
| CN | 101825810 A | 9/2010 |

(Continued)

OTHER PUBLICATIONS

International Search Report and Written Opinion for Application No. PCT/CN2016/102828, dated Dec. 29, 2016, 9 Pages.

*Primary Examiner* — Joseph L Williams
(74) *Attorney, Agent, or Firm* — Brooks Kushman P.C.

(57) ABSTRACT

A liquid crystal adjustment device, a liquid crystal display panel and a method for adjusting an amount of liquid crystals in the liquid crystal display panel are provided. The liquid crystal adjustment device includes a liquid crystal accommodation space in communication with a liquid crystal cell in a liquid crystal display panel. The liquid crystal adjustment device injects liquid crystals into the liquid crystal cell when the liquid crystals in the liquid crystal cell are too many, or expels liquid crystals from the liquid crystal cell when the liquid crystals in the liquid crystal cell are too few, to implement the adjustment of the amount of the liquid (Continued)

crystals in the liquid crystal cell, thereby keeping a stable amount of liquid crystals in the liquid crystal cell.

18 Claims, 2 Drawing Sheets

(56) References Cited

FOREIGN PATENT DOCUMENTS

| | | | |
|---|---|---|---|
| CN | 102262320 | A | 11/2011 |
| CN | 102650771 | A | 8/2012 |
| CN | 105182630 | A | 12/2015 |
| CN | 105629526 | A | 6/2016 |
| JP | 2000081628 | A | 3/2000 |

Fig. 3 the liquid crystal adjustment device injects liquid crystals into the liquid crystal cell or expels liquid crystals from the liquid crystal cell, to keep a stable amount of liquid crystals in the liquid crystal cell ~1001

Fig. 4

LIQUID CRYSTAL ADJUSTMENT DEVICE, CRYSTAL DISPLAY PANEL AND METHOD FOR ADJUSTING AMOUNT OF LIQUID CRYSTALS IN LIQUID CRYSTAL DISPLAY PANEL

CROSS-REFERENCE TO RELATED APPLICATION APPLICATIONS

This application is the U.S. national phase of PCT Application No. PCT/CN2016/102828 filed on Oct. 21, 2016, which claims priority to Chinese Patent Application No. 201610006827.2 filed on Jan. 4, 2016, the disclosures of which are incorporated in their entirety by reference herein.

TECHNICAL FIELD

The present disclosure relates to the field of display technology, and in particular to a liquid crystal adjustment device, a liquid crystal display panel and a method for adjusting an amount of liquid crystals in the liquid crystal display panel.

BACKGROUND

In the manufacturing flow of liquid crystal display, after the machining process for the array substrate and the color film substrate is completed, the array substrate and the color film substrate are required to be arranged oppositely to form a cell. The cell forming process comprises the following four steps: firstly, coating and curing the alignment film on the array substrate and the color film substrate; and then, rubbing the cured alignment film, that is, forming grooves with a predetermined direction on the surface of the alignment film so that liquid crystal molecules are arranged in the predetermined direction; thereafter, drop injecting the liquid crystals, coating the sealant, arranging oppositely the array substrate and the color film substrate to form a cell, and curing the sealant; finally, performing the cutting process, that is, cutting the array substrate and the color film substrate after they are arranged oppositely to form a cell, to form a single liquid crystal cell.

However, after the sealant is cured, the amount of the liquid crystals in the liquid crystal cell cannot be increased or decreased, and too many or too few liquid crystals in the liquid crystal cell may cause poor liquid crystal display effect.

SUMMARY

To solve the above problems, the present disclosure provides a liquid crystal adjustment device, a liquid crystal display panel and a method for adjusting an amount of liquid crystals in the liquid crystal display panel, for solving the problem that the liquid crystal display effect is poor due to too many or too few liquid crystals in the liquid crystal cell.

To this end, the present disclosure provides a liquid crystal adjustment device, comprising a liquid crystal accommodation space in communication with a liquid crystal cell in a liquid crystal display panel. The liquid crystal adjustment device is configured to inject liquid crystals into the liquid crystal cell or expel liquid crystals from the liquid crystal cell to keep a stable amount of liquid crystals in the liquid crystal cell.

Optionally, the liquid crystal accommodation space is configured to provide liquid crystals when the liquid crystal adjustment device injects the liquid crystals into the liquid crystal cell, and receives liquid crystals when the liquid crystal adjustment device expels the liquid crystals from the liquid crystal cell.

Optionally, the liquid crystal adjustment device includes a first detection unit and a first adjustment unit. The first detection unit is configured to detect a change of an amount of liquid crystals in the liquid crystal cell; the first adjustment unit is configured to adjust the amount of the liquid crystals in the liquid crystal cell based on the change of the amount of the liquid crystals in the liquid crystal cell.

Optionally, the first adjustment unit includes a first adjustment module and a second adjustment module. The first adjustment module is configured to inject liquid crystals into the liquid crystal cell in the case that the amount of the liquid crystals in the liquid crystal cell decreases; the second adjustment module is configured to expel liquid crystals from the liquid crystal cell in the case that the amount of the liquid crystals in the liquid crystal cell increases.

Optionally, the liquid crystal adjustment device includes a second detection unit and a second adjustment unit. The second detection unit is configured to detect a change of a cell gap of the liquid crystal cell; the second adjustment unit is configured to adjust an amount of liquid crystals in the liquid crystal cell based on a change of the cell gap of the liquid crystal cell.

Optionally, the second adjustment unit includes a third adjustment module and a fourth adjustment module. The third adjustment module is configured to inject liquid crystals into the liquid crystal cell in the case that the cell gap of the liquid crystal cell decreases; the fourth adjustment module is configured to expel liquid crystals from the liquid crystal cell in the case that the cell gap of the liquid crystal cell increases.

Optionally, a composition material of the first adjustment unit and the second adjustment unit comprises an extendable and retractable material, the length of the extendable and retractable material is changed under the control of voltage or temperature.

Optionally, a composition material of the first adjustment unit and the second adjustment unit comprises an expandable material; the volume of the expandable material is changed under the control of voltage or temperature.

Optionally, the first adjustment unit and the second adjustment unit comprise a blocking plate and a telescopic rod connected to each other, the telescopic rod extends or retracts under the control of voltage or temperature, and the blocking plate is moved forward or backward by the telescopic rod.

The present disclosure further provides a liquid crystal display panel, including a first substrate, a second substrate and the liquid crystal adjustment device mentioned above. The first substrate and the second substrate are oppositely arranged to form a liquid crystal cell.

Optionally, the liquid crystal adjustment device comprises a first side plate, a second side plate and a third side plate, an edge portion of the first side plate is connected to an edge portion of the third side plate, another edge portion of the first side plate is connected to the first substrate, an edge portion of the second side plate is connected to another edge portion of the third side plate, another edge portion of the second side plate is connected to the second substrate, and the first side plate and the second side plate are oppositely arranged to form the liquid crystal accommodation space.

The present disclosure further provides a method for adjusting an amount of liquid crystals in a liquid crystal display panel. The method includes steps of injecting liquid crystals into the liquid crystal cell or expelling liquid crystals from the liquid crystal cell by utilizing a liquid crystal accommodation space in a liquid crystal adjustment device which is in communication with a liquid crystal cell of the liquid crystal display panel.

Optionally, the step of injecting liquid crystals into the liquid crystal cell or expelling liquid crystals from the liquid crystal cell by utilizing a liquid crystal accommodation space in a liquid crystal adjustment device which is in communication with a liquid crystal cell of the liquid crystal display panel includes: providing liquid crystals by the liquid crystal accommodation space when the liquid crystal adjustment device injects the liquid crystals into the liquid crystal cell; receiving liquid crystals by the liquid crystal accommodation space when the liquid crystal adjustment device expels the liquid crystals from the liquid crystal cell.

Optionally, the liquid crystal adjustment device includes a first detection unit and a first adjustment unit. The step of injecting liquid crystals into the liquid crystal cell or expelling liquid crystals from the liquid crystal cell by utilizing a liquid crystal accommodation space in a liquid crystal adjustment device which is in communication with a liquid crystal cell of the liquid crystal display panel includes detecting a change of an amount of the liquid crystals in the liquid crystal cell by the first detection unit and adjusting the amount of the liquid crystals in the liquid crystal cell by the first adjustment unit based on the change of the amount of the liquid crystals in the liquid crystal cell.

Optionally, the first adjustment unit comprises a first adjustment module and a second adjustment module. The adjusting the amount of the liquid crystals in the liquid crystal cell by the first adjustment unit based on the change of the amount of the liquid crystals in the liquid crystal cell includes: injecting liquid crystals into the liquid crystal cell by the first adjustment module when the amount of the liquid crystals in the liquid crystal cell decreases; and expelling liquid crystals from the liquid crystal cell by the second adjustment module when the amount of the liquid crystals in the liquid crystal cell increases.

Optionally, the liquid crystal adjustment device includes a second detection unit and a second adjustment unit. The injecting liquid crystals into the liquid crystal cell or expelling liquid crystals from the liquid crystal cell by utilizing a liquid crystal accommodation space in a liquid crystal adjustment device which is in communication with a liquid crystal cell of the liquid crystal display panel includes: detecting a change of a cell gap of the liquid crystal cell by the second detection unit; and adjusting the amount of the liquid crystals in the liquid crystal cell by the second adjustment unit based on the change of the cell gap of the liquid crystal cell.

Optionally, the second adjustment unit includes a third adjustment module and a fourth adjustment module. The adjusting the amount of the liquid crystals in the liquid crystal cell by the second adjustment unit based on the change of the cell gap of the liquid crystal cell includes: injecting liquid crystals into the liquid crystal cell by the third adjustment module when the cell gap of the liquid crystal cell decreases; and expelling liquid crystals from the liquid crystal cell by the fourth adjustment module when the cell gap of the liquid crystal cell increases.

Optionally, a composition material of the first adjustment unit and the second adjustment unit comprises an extendable and retractable material, the length of the extendable and retractable material is changed under the control of voltage or temperature.

Optionally, a composition material of the first adjustment unit and the second adjustment unit comprises an expandable material, the volume of the expandable material is changed under the control of voltage or temperature.

Optionally, the first adjustment unit and the second adjustment unit include a blocking plate and a telescopic rod connected to each other, the telescopic rod extends or retracts under the control of voltage or temperature, and the blocking plate is moved forward or backward by the telescopic rod.

The present disclosure has the following beneficial effects. In the liquid crystal adjustment device, the liquid crystal display panel and the method for adjusting an amount of liquid crystals in the liquid crystal display panel provided by the present disclosure, the liquid crystal adjustment device includes a liquid crystal accommodation space in communication with the liquid crystal cell in the liquid crystal display panel. The liquid crystal adjustment device injects liquid crystals into the liquid crystal cell or expels liquid crystals from the liquid crystal cell when the liquid crystals in the liquid crystal cell are too many or two few, to implement the adjustment of the amount of the liquid crystals in the liquid crystal cell, thereby keeping a stable amount of liquid crystals in the liquid crystal cell. The technical solution provided by the present disclosure mitigates poor display caused by fluctuations of the amount of liquid crystals in the liquid crystal cell, and improves controllability of the process flow.

DETAILED DESCRIPTION

In order for those skilled in the art to better understand the technical solution of the present disclosure, the liquid crystal adjustment device and the adjustment method thereof, and the liquid crystal display panel provided by the present disclosure will now be described below in detail in conjunction with the accompanying drawings.

At least some embodiments of the present disclosure provide a liquid crystal adjustment device comprising a liquid crystal accommodation space in communication with a liquid crystal cell within a liquid crystal display panel, the liquid crystal adjustment device being configured to inject liquid crystals into the liquid crystal cell or expel liquid crystals from the liquid crystal cell to keep the stability of the amount of liquid crystals in the liquid crystal cell. Specifically, when the liquid crystals in the liquid crystal cell are too few, the liquid crystal adjustment device injects liquid crystals into the liquid crystal cell, and when the liquid crystals in the liquid crystal cell are too many, the liquid crystal adjustment device expels the liquid crystals from the liquid crystal cell to implement the adjustment of the amount of the liquid crystals in the liquid crystal cell, thereby keeping a stable amount of liquid crystals in the liquid crystal cell. The technical solution provided by the present disclosure reduces poor display caused by fluctuations of the amount of liquid crystals in the liquid crystal cell, and improves controllability of the process flow.

In the present embodiment, the accommodation space stores a predetermined amount of liquid crystals in advance. Since the liquid crystal accommodation space communicates with the liquid crystal cell, the liquid crystals in the accommodation space are connected to the liquid crystals in the liquid crystal cell. The liquid crystal accommodation space is configured to provide liquid crystals when the liquid crystal adjustment device injects the liquid crystals into the liquid crystal cell, and receives liquid crystals when the liquid crystal adjustment device expels the liquid crystals from the liquid crystal cell, thereby keeping a stable amount of liquid crystals in the liquid crystal cell.

Figure 1:
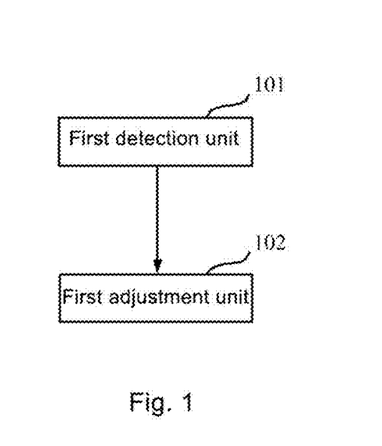
FIG. 1 is a schematic structural view of a liquid crystal adjustment device provided by at least some embodiments of the present disclosure.

FIG. 1 is a schematic structural view of a liquid crystal adjustment device provided by at least some embodiments of the present disclosure. As shown in FIG. 1, the liquid crystal adjustment device includes a first detection unit 101 and a first adjustment unit 102. The first detection unit 101 is configured to detect a change of an amount of liquid crystals in the liquid crystal cell, and the first adjustment unit 102 is configured to adjust the amount of the liquid crystals in the liquid crystal cell based on the change of the amount of the liquid crystals in the liquid crystal cell. Optionally, the first adjustment unit 102 comprises a first adjustment module and a second adjustment module. The first adjustment module is configured to inject liquid crystals into the liquid crystal cell in the case that the amount of the liquid crystals in the liquid crystal cell decreases, and the second adjustment module is configured to expel liquid crystals from the liquid crystal cell in the case that the amount of the liquid crystals in the liquid crystal cell increases.

Optionally, a composition material of the first adjustment unit 102 includes an extendable and retractable material, a length of the extendable and retractable material is changed under the control of voltage or temperature, so that the liquid crystal accommodation space injects into or expels from the liquid crystal cell liquid crystals. By means of the extension or retraction of the extendable and retractable material of the first adjustment unit 102 provided by the present embodiment under the control of voltage or temperature, liquid crystals are injected into or expelled from the liquid crystal cell, thereby keeping a stable amount of liquid crystals in the liquid crystal cell. The technical solution provided by the present disclosure mitigates poor display caused by fluctuations of the amount of liquid crystals in the liquid crystal cell, and improves controllability of the process flow.

The first adjustment unit 102 in the present embodiment comprises a blocking plate and a telescopic rod connected to each other, the telescopic rod extends or retracts under the control of voltage or temperature, and the blocking plate is moved forward or backward by the telescopic rod, so that the liquid crystal accommodation space injects into or expels from the liquid crystal cell liquid crystals. By means of the change of the length of the telescopic rod under the control of voltage or temperature to move the blocking plate forward or backward, liquid crystals are injected into or expelled from the liquid crystal cell, thereby keeping a stable amount of liquid crystals in the liquid crystal cell.

Optionally, a composition material of the first adjustment unit 102 comprises an expandable material of which the volume is changed under the control of voltage or temperature, so that the liquid crystal accommodation space injects into or expels from the liquid crystal cell liquid crystals. By means of the expansion of the volume of the expandable material of the first adjustment unit 102 provided by the present embodiment under the control of voltage or temperature, liquid crystals are injected into or expelled from the liquid crystal cell, thereby keeping a stable amount of liquid crystals in the liquid crystal cell.

Figure 2:
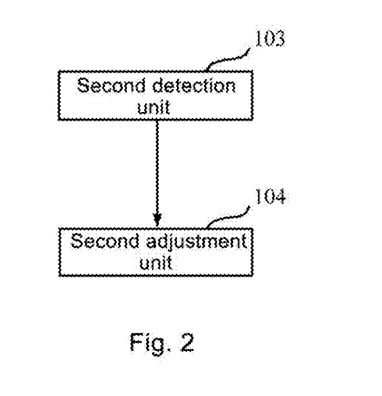
FIG. 2 is another schematic structural view of a liquid crystal adjustment device provided by at least some embodiments of the present disclosure.

FIG. 2 is another schematic structural view of a liquid crystal adjustment device provided by at least some embodiments of the present disclosure. As shown in FIG. 2, the liquid crystal adjustment device includes a second detection unit 103 and a second adjustment unit 104. The second detection unit 103 is configured to detect a change of a cell gap of the liquid crystal cell, and the second adjustment unit 104 is configured to adjust an amount of liquid crystals in the liquid crystal cell based on a change of the cell gap of the liquid crystal cell. Optionally, the second adjustment unit 104 includes a third adjustment module and a fourth adjustment module. The third adjustment module is configured to inject liquid crystals into the liquid crystal cell in the case that the cell gap of the liquid crystal cell decreases, and the fourth adjustment module is configured to expel liquid crystals from the liquid crystal cell in the case that the cell gap of the liquid crystal cell increases.

In the present embodiment, a plurality of liquid crystal adjustment devices are provided on the periphery of the liquid crystal panel, and the second detection unit 103 monitors the cell gap of the liquid crystal cell through a sensor. When liquid crystals of the display panel expand or retract due to an external temperature change or the injection of liquid crystals, the cell gap of the liquid crystal cell will change. The second detection unit 103 monitors a change of a pressure on a spacer through a sensor, and feeds the change of the pressure back to the liquid crystal adjustment device. In this case, the second adjustment unit 104 absorbs or releases a certain amount of liquid crystals according to the cell gap change and the pressure change of the liquid crystal cell, keeps the stability of the cell gap of the liquid crystal cell, thereby preventing poor effects caused by puncturing due to too many liquid crystals or bubbles due to too few liquid crystals.

Optionally, a composition material of the second adjustment unit 104 includes an extendable and retractable material, the length of the extendable and retractable material is changed under the control of voltage or temperature, so that the liquid crystal accommodation space injects into or expels from the liquid crystal cell liquid crystals. By means of the extension or retraction of the extendable and retractable material of the second adjustment unit 104 provided by the present embodiment under the control of voltage or temperature, liquid crystals are injected into or expelled from the liquid crystal cell, thereby keeping a stable amount of liquid crystals in the liquid crystal cell.

The second adjustment unit 104 in the present embodiment includes a blocking plate and a telescopic rod connected to each other, the telescopic rod extends or retracts under the control of voltage or temperature, and the blocking plate is moved forward or backward by the telescopic rod, so that the liquid crystal accommodation space injects into or expels from the liquid crystal cell liquid crystals. By means of the change of the length of the telescopic rod under the control of voltage or temperature to move the blocking plate forward or backward, liquid crystals are injected into or expelled from the liquid crystal cell, thereby keeping a stable amount of liquid crystals in the liquid crystal cell.

Optionally, a composition material of the second adjustment unit 104 includes an expandable material of which the volume changed under the control of voltage or temperature, so that the liquid crystal accommodation space injects into or expels from the liquid crystal cell liquid crystals. By means of the expansion of the volume of the expandable material of the second adjustment unit 104 provided by the present embodiment under the control of voltage or temperature, liquid crystals are injected into or expelled from the liquid crystal cell, thereby keeping a stable amount of liquid crystals in the liquid crystal cell.

The liquid crystal adjustment device provided by the present embodiment includes a liquid crystal accommodation space in communication with the liquid crystal cell in the liquid crystal display panel. When the liquid crystals in the liquid crystal cell are too many or two few, the liquid crystal adjustment device injects liquid crystals into the liquid crystal cell or expels liquid crystals from the liquid crystal cell, to implement the adjustment of the amount of the liquid crystals in the liquid crystal cell, thereby keeping a stable amount of liquid crystals in the liquid crystal cell. The technical solution provided by the present disclosure mitigates poor display caused by fluctuations of the amount of liquid crystals in the liquid crystal cell, and improves controllability of the process flow.

Figure 3:
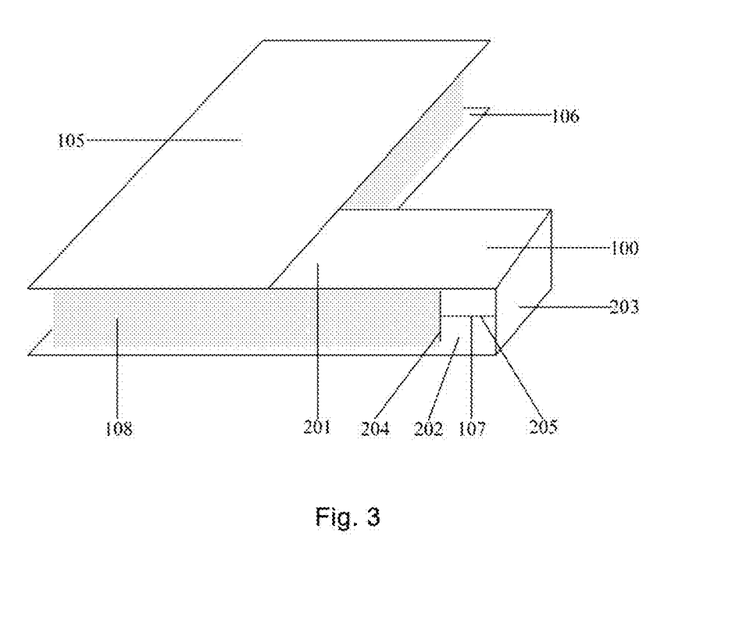
FIG. 3 is a schematic structural view of a liquid crystal display panel provided by at least some embodiments of the present disclosure.

FIG. 3 is a schematic structural view of a liquid crystal display panel provided by at least some embodiments of the present disclosure. As shown in FIG. 3, the liquid crystal display panel includes a first substrate 105, a second substrate 106, and the liquid crystal adjustment device 100. The specific contents of the liquid crystal display device can be referred to above, and will not be described herein.

In the present embodiment, the first substrate 105 and the second substrate 106 are oppositely arranged to form a liquid crystal cell. The liquid crystal adjustment device 100 includes a liquid crystal accommodation space and an adjustment unit 107, the liquid crystal accommodation space communicates with the liquid crystal cell, and the liquid crystals 108 are provided in the accommodation space and in the liquid crystal cell. When the liquid crystals in the liquid crystal cell are too few, the adjustment unit 107 injects liquid crystals into the liquid crystal cell, and when the liquid crystals in the liquid crystal cell are too many, the adjustment unit 107 expels the liquid crystals from the liquid crystal cell, to implement the adjustment of the amount of the liquid crystals in the liquid crystal cell, thereby keeping a stable amount of liquid crystals in the liquid crystal cell.

With reference to FIG. 3, the liquid crystal adjustment device includes a first side plate 201, a second side plate 202 and a third side plate 203, an edge portion of the first side plate 201 is connected to an edge portion of the third side plate 203, another edge portion of the first side plate 201 is connected to the first substrate 105. Optionally, the first side plate 201 is connected to the first substrate 105 through a sealant. An edge portion of the second side plate 202 is connected to another edge portion of the third side plate 203, and another edge portion of the second side plate 202 is connected to the second substrate 106. Optionally, the second side plate 202 is connected to the second substrate 106 through a sealant. The first side plate 201 and the second side plate 202 are oppositely arranged to form the liquid crystal accommodation space. The liquid crystal accommodation space communicates with the liquid crystal cell, and the liquid crystal accommodation space stores a certain amount of liquid crystals in advance. Since the liquid crystal accommodation space communicates with the liquid crystal cell, the liquid crystals in the liquid crystal accommodation space are connected to the liquid crystals in the liquid crystal cell. The liquid crystal accommodation space is configured to provide liquid crystals when the liquid crystal adjustment device injects the liquid crystals into the liquid crystal cell, and receives liquid crystals when the liquid crystal adjustment device expels the liquid crystals from the liquid crystal cell, thereby keeping a stable amount of liquid crystals in the liquid crystal cell.

In the present embodiment, the adjustment unit arranged between the first side plate 201 and the second side plate 202 includes a blocking plate 204 and a telescopic rod 205 connected to each other, the telescopic rod 205 extends or retracts under the control of voltage or temperature, and the blocking plate 204 is moved forward or backward by the telescopic rod 205, so that the liquid crystal accommodation space injects into or expels from the liquid crystal cell liquid crystals. By means of the change of the length of the telescopic rod 205 in the present embodiment under the control of voltage or temperature to move the blocking plate 204 forward or backward, liquid crystals are injected into or expelled from the liquid crystal cell.

In the liquid crystal display panel provided by the present embodiment, the liquid crystal adjustment device includes a liquid crystal accommodation space in communication with the liquid crystal cell in the liquid crystal display panel. When the liquid crystals in the liquid crystal cell are too many or two few, the liquid crystal adjustment device injects liquid crystals into the liquid crystal cell or expels liquid crystals from the liquid crystal cell, to implement the adjustment of the amount of the liquid crystals in the liquid crystal cell, thereby keeping a stable amount of liquid crystals in the liquid crystal cell. The technical solution provided by the present disclosure mitigates poor display caused by fluctuations of the amount of liquid crystals in the liquid crystal cell, and improves controllability of the process flow.

Figure 4:
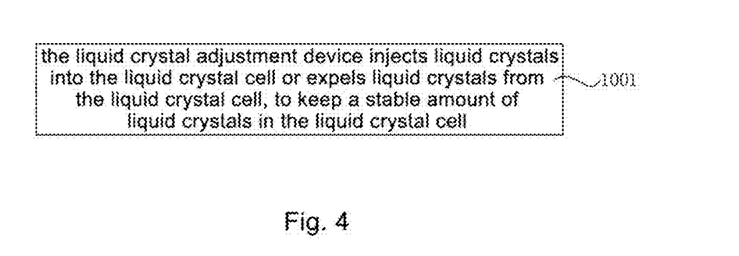
FIG. 4 is a flow chart of a method of adjusting an amount of liquid crystals in a liquid crystal display panel provided by at least some embodiments of the present disclosure.

FIG. 4 is a flow chart of a method of adjusting an amount of liquid crystals in a liquid crystal display panel provided by at least some embodiments of the present disclosure. As shown in FIG. 4, the adjustment method includes the following steps.

In step 1001, the liquid crystal adjustment device injects liquid crystals into the liquid crystal cell or expels the liquid crystals from the liquid crystal cell to keep a stable amount of liquid crystals in the liquid crystal cell.

In the present embodiment, when the liquid crystals in the liquid crystal cell are too few, the liquid crystal adjustment device injects liquid crystals into the liquid crystal cell, when the liquid crystals in the liquid crystal cell are too many, the liquid crystal adjustment device expels liquid crystals from the liquid crystal cell, so as to implement the adjustment of the amount of the liquid crystals in the liquid crystal cell, thereby keeping a stable amount of liquid crystals in the liquid crystal cell. The technical solution provided by the present disclosure mitigates poor display caused by fluctuations of the amount of liquid crystals in the liquid crystal cell, and improves controllability of the process flow.

In the present embodiment, the liquid crystal adjustment device includes a liquid crystal accommodation space in communication with the liquid crystal cell. The step of the liquid crystal adjustment device injecting liquid crystals into the liquid crystal cell or expelling liquid crystals from the liquid crystal cell includes, the liquid crystal accommodation space providing liquid crystals when the liquid crystal adjustment device injects the liquid crystals into the liquid crystal cell, and receiving liquid crystals when the liquid crystal adjustment device expels the liquid crystals from the liquid crystal cell. Specifically, the liquid crystal accommodation space stores a certain amount of liquid crystals in advance. Since the liquid crystal accommodation space communicates with the liquid crystal cell, the liquid crystals in the accommodation space are connected to the liquid crystals in the liquid crystal cell. The liquid crystal accommodation space provides liquid crystals when the liquid crystal adjustment device injects the liquid crystals into the liquid crystal cell, and receives liquid crystals when the liquid crystal adjustment device expels the liquid crystals from the liquid crystal cell, thereby keeping a stable amount of liquid crystals in the liquid crystal cell.

In the present embodiment, the liquid crystal adjustment device includes a first detection unit and a first adjustment unit. The step of the liquid crystal adjustment device injecting into or expelling from the liquid crystal cell liquid crystals includes: the first detection unit detecting a change of an amount of the liquid crystals in the liquid crystal cell; the first adjustment unit adjusting the amount of the liquid crystals in the liquid crystal cell based on the change of the amount of the liquid crystals in the liquid crystal cell. Optionally, the first adjustment unit includes a first adjustment module and a second adjustment module. The step of the first adjustment unit adjusting the amount of the liquid crystals in the liquid crystal cell based on the change of the amount of the liquid crystals in the liquid crystal cell includes: the first adjustment module injecting liquid crystals into the liquid crystal cell when the amount of the liquid crystals in the liquid crystal cell decreases; the second adjustment module expelling liquid crystals from the liquid crystal cell in when the amount of the liquid crystals in the liquid crystal cell increases.

Optionally, a composition material of the first adjustment unit includes an extendable and retractable material, the length of the extendable and retractable is changed under the control of voltage or temperature, so that the liquid crystal accommodation space injects into or expels from the liquid crystal cell liquid crystals. By means of the extension or retraction of the extendable and retractable material of the first adjustment unit provided by the present embodiment under the control of voltage or temperature, liquid crystals are injected into or expelled from the liquid crystal cell, thereby keeping a stable amount of liquid crystals in the liquid crystal cell. The technical solution provided by the present disclosure mitigates poor display caused by fluctuations of the amount of liquid crystals in the liquid crystal cell, and improves controllability of the process flow.

Optionally, a composition material of the first adjustment unit includes an expandable material of which the volume is changed under the control of voltage or temperature, so that the liquid crystal accommodation space injects into or expels from the liquid crystal cell liquid crystals. By means of controlling the expansion of the volume of the expandable material of the first adjustment unit provided by the present embodiment under the control of voltage or temperature, liquid crystals are injected into or expelled from the liquid crystal cell, thereby keeping a stable amount of liquid crystals in the liquid crystal cell.

The first adjustment unit in the present embodiment includes a blocking plate and a telescopic rod connected to each other, the telescopic rod extends or retracts under the control of voltage or temperature, and the blocking plate is moved forward or backward by the telescopic rod, so that the liquid crystal accommodation space injects into or expels from the liquid crystal cell liquid crystals. By means of the change of the length of the telescopic rod under the control of voltage or temperature to move the blocking plate forward or backward, liquid crystals are injected into or expelled from the liquid crystal cell, thereby keeping a stable amount of liquid crystals in the liquid crystal cell.

Optionally, a composition material of the first adjustment unit includes an expandable material of which the volume is changed under the control of voltage or temperature, so that the liquid crystal accommodation space injects into or expels from the liquid crystal cell liquid crystals. By means of controlling the expansion of the volume of the expandable material of the first adjustment unit provided by the present embodiment under the control of voltage or temperature, liquid crystals are injected into or expelled from the liquid crystal cell, thereby keeping a stable amount of liquid crystals in the liquid crystal cell.

In the present embodiment, the liquid crystal adjustment device includes a second detection unit and a second adjustment unit. The step of the liquid crystal adjustment device injecting into or expelling from the liquid crystal cell liquid crystals includes: the second detection unit detecting a change of a cell gap of the liquid crystal cell; the second adjustment unit adjusting the amount of the liquid crystals in the liquid crystal cell based on the change of the cell gap of the liquid crystal cell. Optionally, the second adjustment unit includes a third adjustment module and a fourth adjustment module. The step of the second adjustment unit adjusting the amount of the liquid crystals in the liquid crystal cell based on the change of the cell gap of the liquid crystal cell includes: the third adjustment module injecting liquid crystals into the liquid crystal cell in the case where the cell gap of the liquid crystal cell decreases; the fourth adjustment module expelling liquid crystals from the liquid crystal cell in the case where the cell gap of the liquid crystal cell increases.

In practice, a plurality of liquid crystal adjustment devices are provided on the periphery of the liquid crystal panel, and the second detection unit monitors the cell gap of the liquid crystal cell through a sensor. When liquid crystals of the display panel expand or retract due to an external temperature change or the injection of liquid crystals, the cell gap of the liquid crystal cell will change. The second detection unit monitors the change of the pressure on a spacer through a sensor, and feeds the pressure change back to the liquid crystal adjustment device. In this case, the second adjustment unit absorbs or releases a certain amount of liquid crystals according to the cell gap change and the pressure change of the liquid crystal cell, keeps the stability of the cell gap of the liquid crystal cell, thereby preventing poor effects caused by puncturing due to too many liquid crystals or bubbles due to too few liquid crystals.

Optionally, a composition material of the second adjustment unit includes an extendable and retractable material, the length of the extendable and retractable is changed under the control of voltage or temperature, so that the liquid crystal accommodation space injects into or expels from the liquid crystal cell liquid crystals. By means of the extension or retraction of the extendable and retractable material of the second adjustment unit provided by the present embodiment under the control of voltage or temperature, liquid crystals are injected into or expelled from the liquid crystal cell, thereby keeping a stable amount of liquid crystals in the liquid crystal cell.

The second adjustment unit in the present embodiment includes a blocking plate and a telescopic rod connected to each other, the telescopic rod extends or retracts under the control of voltage or temperature, and the blocking plate is moved forward or backward by the telescopic rod, so that the liquid crystal accommodation space injects into or expels from the liquid crystal cell liquid crystals. By means of the change of the length of the telescopic rod under the control of voltage or temperature to move the blocking plate forward or backward, liquid crystals are injected into or expelled from the liquid crystal cell, thereby keeping a stable amount of liquid crystals in the liquid crystal cell.

Optionally, a composition material of the second adjustment unit includes an expandable material of which the volume is changed under the control of voltage or temperature, so that the liquid crystal accommodation space injects into or expels from the liquid crystal cell liquid crystals. By means of the expansion of the volume of the expandable material of the second adjustment unit provided by the present embodiment under the control of voltage or temperature, liquid crystals are injected into or expelled from the liquid crystal cell, thereby keeping a stable amount of liquid crystals in the liquid crystal cell.

The adjustment method provided in the present embodiment includes: the liquid crystal adjustment device injecting liquid crystals into the liquid crystal cell or expelling liquid crystals from the liquid crystal cell to keep a stable amount of liquid crystals in the liquid crystal cell. When the liquid crystals in the liquid crystal cell are too many, the liquid crystal adjustment device injects liquid crystals into the liquid crystal cell, when the liquid crystals in the liquid crystal cell are too few, the liquid crystal adjustment device expels liquid crystals from the liquid crystal cell, to implement the adjustment of the amount of the liquid crystals in the liquid crystal cell, thereby keeping a stable amount of liquid crystals in the liquid crystal cell. The technical solution provided by the present disclosure mitigates poor display caused by fluctuations of the amount of liquid crystals in the liquid crystal cell, and improves controllability of the process flow.

It may be appreciated that the above embodiments are merely the exemplary embodiments used for illustrating the principles of the present disclosure, but the present disclosure is not limited thereto. Those of ordinary skill in the art may make various modifications and alternations without departing from the spirit and essence of the present disclosure, and these modifications and alternations shall also be construed to fall within the scope of protection sought for by the present disclosure.

What is claimed is:

1. A liquid crystal adjustment device, comprising
a liquid crystal accommodation space, in communication with a liquid crystal cell in a liquid crystal display panel;
a first detection unit, configured to detect a change of an amount of liquid crystals in the liquid crystal cell; and
a first adjustment unit, configured to adjust the amount of the liquid crystals in the liquid crystal cell based on the change of the amount of the liquid crystals in the liquid crystal cell,
wherein a composition material of the first adjustment unit comprises an extendable and retractable material, the length of the extendable and retractable material is changed under the control of voltage or temperature, or
a composition material of the first adjustment unit comprises an expandable material, the volume of the expandable material is changed under the control of voltage or temperature.

2. The liquid crystal adjustment device according to claim 1, wherein the liquid crystal accommodation space is configured to provide liquid crystals when the liquid crystal adjustment device injects the liquid crystals into the liquid crystal cell, and receives liquid crystals when the liquid crystal adjustment device expels the liquid crystals from the liquid crystal cell.

3. The liquid crystal adjustment device according to claim 1, wherein the first adjustment unit comprises a first adjustment module and a second adjustment module, wherein
the first adjustment module is configured to inject liquid crystals into the liquid crystal cell in the case that the amount of the liquid crystals in the liquid crystal cell decreases;
the second adjustment module is configured to expel liquid crystals from the liquid crystal cell in the case that the amount of the liquid crystals in the liquid crystal cell increases.

4. The liquid crystal adjustment device according to claim 1, further comprising a second detection unit and a second adjustment unit, wherein
the second detection unit is configured to detect a change of a cell gap of the liquid crystal cell;
the second adjustment unit is configured to adjust an amount of liquid crystals in the liquid crystal cell based on the change of the cell gap of the liquid crystal cell.

5. The liquid crystal adjustment device according to claim 4, wherein the second adjustment unit comprises a third adjustment module and a fourth adjustment module, wherein
the third adjustment module is configured to inject liquid crystals into the liquid crystal cell in the case that the cell gap of the liquid crystal cell decreases;
the fourth adjustment module is configured to expel liquid crystals from the liquid crystal cell in the case that the cell gap of the liquid crystal cell increases.

6. The liquid crystal adjustment device according to claim 4, wherein a composition material of the second adjustment unit comprises an extendable and retractable material, the length of the extendable and retractable material is changed under the control of voltage or temperature.

7. The liquid crystal adjustment device according to claim 4, wherein a composition material of the second adjustment unit comprises an expandable material, the volume of the expandable material is changed under the control of voltage or temperature.

8. The liquid crystal adjustment device according to claim 4, wherein the first adjustment unit and the second adjustment unit comprise a blocking plate and a telescopic rod connected to each other, the telescopic rod extends or retracts under the control of voltage or temperature, and the blocking plate is moved forward or backward by the telescopic rod.

9. A liquid crystal display panel, comprising a first substrate, a second substrate and the liquid crystal adjustment device according to claim 1, wherein the first substrate and the second substrate are oppositely arranged to form a liquid crystal cell, and the liquid crystal accommodation space in the liquid crystal adjustment device is in communication with the liquid crystal cell.

10. The liquid crystal display panel according to claim 9, wherein the liquid crystal adjustment device comprises a first side plate, a second side plate and a third side plate, an edge portion of the first side plate is connected to an edge portion of the third side plate, another edge portion of the first side plate is connected to the first substrate, an edge portion of the second side plate is connected to another edge portion of the third side plate, another edge portion of the second side plate is connected to the second substrate, and the first side plate and the second side plate are oppositely arranged to form the liquid crystal accommodation space.

11. A method for adjusting an amount of liquid crystals in a liquid crystal display panel, comprising:
injecting liquid crystals into the liquid crystal cell or expelling liquid crystals from the liquid crystal cell by utilizing a liquid crystal accommodation space in a liquid crystal adjustment device which is in communication with a liquid crystal cell of the liquid crystal display panel;

detecting, by a first detection unit, a change of an amount of liquid crystals in the liquid crystal cell; and adjusting, by a first adjustment unit, the amount of the liquid crystals in the liquid crystal cell based on the change of the amount of the liquid crystals in the liquid crystal cell, wherein a composition material of the first adjustment unit comprises an extendable and retractable material, the length of the extendable and retractable material is changed under the control of voltage or temperature, or a composition material of the first adjustment unit comprises an expandable material, the volume of the expandable material is changed under the control of voltage or temperature.

12. The method according to claim 11, wherein the injecting liquid crystals into the liquid crystal cell or expelling liquid crystals from the liquid crystal cell by utilizing a liquid crystal accommodation space in a liquid crystal adjustment device which is in communication with a liquid crystal cell of the liquid crystal display panel comprises:

providing liquid crystals by the liquid crystal accommodation space when the liquid crystal adjustment device injects the liquid crystals into the liquid crystal cell;

receiving liquid crystals by the liquid crystal accommodation space when the liquid crystal adjustment device expels the liquid crystals from the liquid crystal cell.

13. The method according to claim 11, wherein the first adjustment unit comprises a first adjustment module and a second adjustment module;

the adjusting the amount of the liquid crystals in the liquid crystal cell by the first adjustment unit based on the change of the amount of the liquid crystals in the liquid crystal cell comprises:

injecting liquid crystals into the liquid crystal cell by the first adjustment module when the amount of the liquid crystals in the liquid crystal cell decreases;

expelling liquid crystals from the liquid crystal cell by the second adjustment module when the amount of the liquid crystals in the liquid crystal cell increases.

14. The method according to claim 11, wherein the liquid crystal adjustment device comprises a second detection unit and a second adjustment unit;

the injecting liquid crystals into the liquid crystal cell or expelling liquid crystals from the liquid crystal cell by utilizing a liquid crystal accommodation space in a liquid crystal adjustment device which is in communication with a liquid crystal cell of the liquid crystal display panel comprises:

detecting a change of a cell gap of the liquid crystal cell by the second detection unit;

adjusting the amount of the liquid crystals in the liquid crystal cell by the second adjustment unit based on the change of the cell gap of the liquid crystal cell.

15. The method according to claim 14, wherein the second adjustment unit comprises a third adjustment module and a fourth adjustment module;

the adjusting the amount of the liquid crystals in the liquid crystal cell by the second adjustment unit based on the change of the cell gap of the liquid crystal cell comprises:

injecting liquid crystals into the liquid crystal cell by the third adjustment module when the cell gap of the liquid crystal cell decreases;

expelling liquid crystals from the liquid crystal cell by the fourth adjustment module when the cell gap of the liquid crystal cell increases.

16. The method according to claim 14, wherein a composition material of the second adjustment unit comprises an extendable and retractable material, the length of the extendable and retractable material is changed under the control of voltage or temperature.

17. The method according to claim 14, wherein a composition material of the second adjustment unit comprises an expandable material, the volume of the expandable material is changed under the control of voltage or temperature.

18. The method according to claim 14, wherein the second adjustment unit comprise a blocking plate and a telescopic rod connected to each other, the telescopic rod extends or retracts under the control of voltage or temperature, and the blocking plate is moved forward or backward by the telescopic rod.

* * * * *